United States Patent [19]

Russell

[11] 4,015,286
[45] Mar. 29, 1977

[54] DIGITAL COLOR TELEVISION SYSTEM
[75] Inventor: James T. Russell, Richland, Wash.
[73] Assignee: Eli S. Jacobs, New York, N.Y.
[22] Filed: Jan. 23, 1975
[21] Appl. No.: 543,361
[52] U.S. Cl. .................................. 358/13; 358/4
[51] Int. Cl.² .................... H04N 5/86; H04N 9/34
[58] Field of Search .......................... 358/4, 12, 13

[56] References Cited
UNITED STATES PATENTS

| | | | |
|---|---|---|---|
| 2,969,425 | 1/1961 | Hughes | 358/4 |
| 3,535,433 | 10/1970 | Arimura et al. | 358/12 |
| 3,617,620 | 11/1971 | Arimura | 358/12 |
| 3,720,780 | 8/1971 | Remy et al. | 358/13 |
| 3,781,463 | 12/1973 | Van den Bussche | 358/4 |

Primary Examiner—John C. Martin
Attorney, Agent, or Firm—Klarquist, Sparkman, Campbell, Leigh, Hall & Whinston

[57] ABSTRACT

A digital color television system is described in which only one chrominance component of the video color television signal is transmitted for each television line, and digital delay means is employed for delaying at least one of the two chrominance components I and Q of the color television signal so that the delayed chrominance component can be added to the transmitted television signal to produce output signals having both chrominance components. The system includes a recording apparatus for recording the digital color television signal on a record which may be an optical or magnetic record, and a playback apparatus for playing back the recorded signal to a television receiver or other utilization device. A gate means is provided in the recording apparatus for selectively transmitting a conventional digital color television signal having two chrominance components as an altered digital television signal having only one chrominance component per line which is different on alternate lines. As a result, the amount of information stored on the record is greatly reduced. In one embodiment of the system, the two chrominance components I and Q are recorded between luminance words Y with different chrominance components recorded in alternate television lines. A single digital storage means such as a shift register is used in the playback apparatus. In the other embodiment, the chrominance components are recorded at the end of each television line in the horizontal blanking region, with different chrominance components being recorded in alternate lines. This necessitates two digital storage means of the recirculating type in the playback unit, one storage means for each of the two chrominance components because both are recorded out of their proper sequence with the luminance words.

14 Claims, 4 Drawing Figures

DIGITAL COLOR TELEVISION SYSTEM

BACKGROUND OF THE INVENTION

The subject matter of the present invention relates to a digital color television system in general and more specifically to such a system in which only one of the two chrominance components I and Q is transmitted and/or recorded for each television line and digital delay means is used to delay the chrominance component of an adjacent line to enable it to be combined with that of the transmitted line to produce an output television signal having both chrominance components per line.

The television system of the present invention is especially useful in recording digital color television signals on optical records because it reduces the amount of information which must be stored on such record for each television line.

Previously it has been proposed in analog color television systems to use a delay line in the television receiver to delay one of the chrominance components so that such receiver displays a picture having television lines with both chrominance components even though only one chrominance component is transmitted per line. This European television system, called SECAM, was designed this way to reduce problems and color phase control. However, color phase control is not a problem when transmitting digital color television signals. A similar analog color television system employing an analog signal delay line is shown in U.S. Pat. No. 3,571,494 of Law, issued Mar. 16, 1971, which reduces band width requirements by sampling the analog video signal and shifting the sampling points.

It has also been proposed by K. Compaan et al in *Philips Technical Review*, Vol. 33, pages 178–185, 1973, No. 7, to record and playback video television signals on optical records. However, records on the order of 30 centimeters in diameter were required for storing 30 minutes of television programming. By using the television system of the present invention to record and playback a digital television signal, the amount of information to be stored is greatly reduced which of course enables a reduction in size of the records and/or increased playing time per record.

SUMMARY OF THE INVENTION

It is therefore one object of the present invention to provide an improved digital color television which reduces the amount of transmitted video signal information by transmitting only one of the two chrominance signal components per television line with different chrominance components used in alternate lines.

Another object of the invention is to provide such a television system in which a digital delay means is employed to delay at least one chrominance component and to combine it with the transmitted video signal to produce an output signal having both chrominance components in each television line.

A further object of the present invention is to provide such a television system including a recording apparatus for recording the transmitted digital video television signal after it is altered to contain only a single chrominance component in order to reduce the amount of video signal information per television line which is stored on the record.

An additional object of the invention is to provide such a television system including a playback apparatus for playing back the record and transmitting the recorded digital television signal through the digital delay means to produce a delayed chrominance component which, when added to the transmitted signal, produces an output video signal having two chrominance components per line.

A still further object of the present invention is to provide such a color television system in which the two different chrominance components are recorded in the horizontal blanking period of alternate television lines to provide a further reduction of the recorded information density.

BRIEF DESCRIPTION OF DRAWINGS

Other objects and advantages of the present invention will be apparent from the following detailed descriptions of preferred embodiments thereof and from the attached drawings of which.

DESCRIPTION OF PREFERRED EMBODIMENTS

Figure 1:
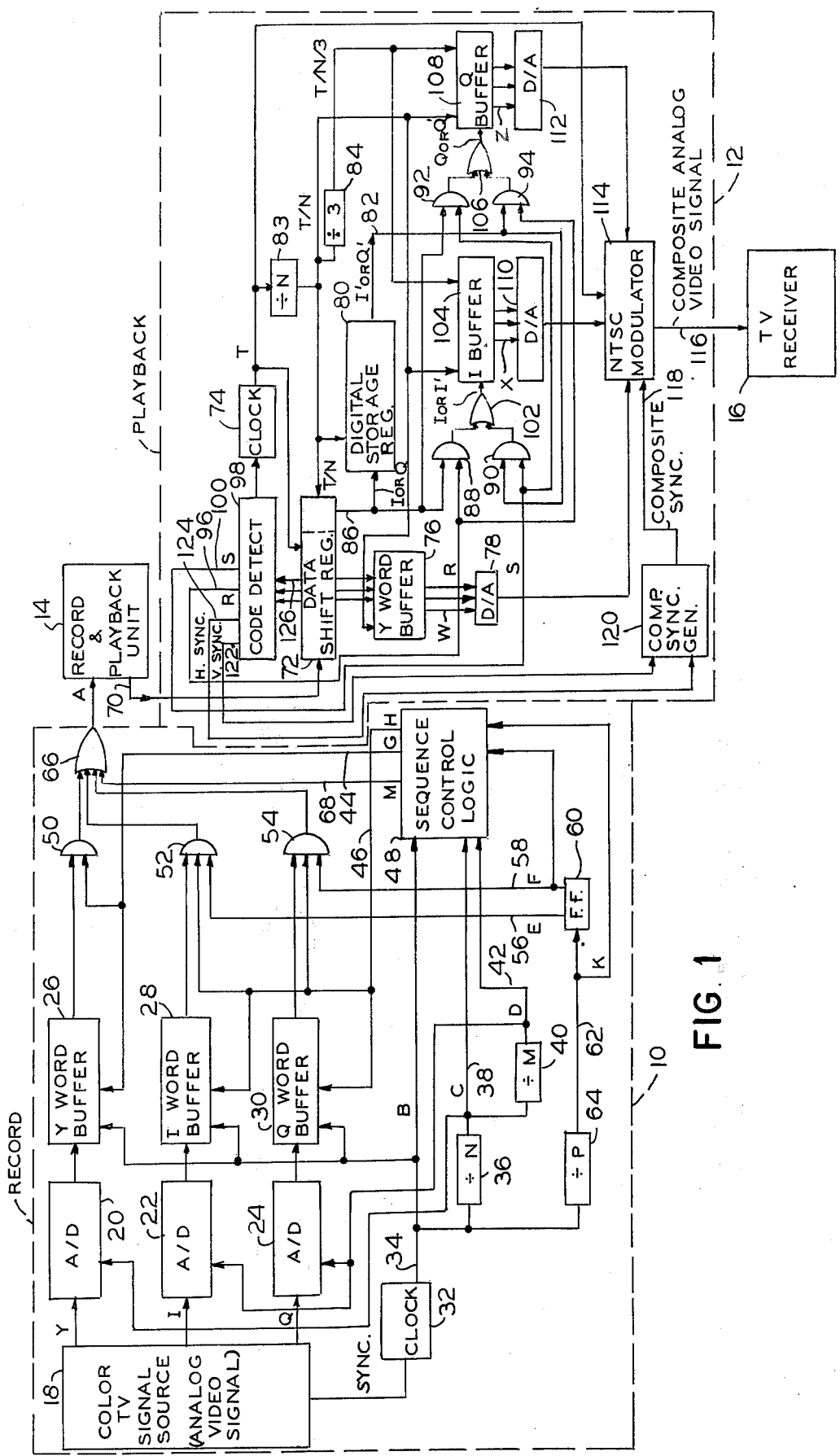
FIG. 1 is a schematic diagram of the electrical circuit of one embodiment of the digital color television system of the present invention.

As shown in FIG. 1, one embodiment of the digital color television system of the present invention includes a recording circuit 10 and a playback circuit 12 with a record and/or playback unit 14 connected between the output of the recording circuit 10 and the input of the playback circuit 12. The output of the playback circuit 12 is connected to a conventional television receiver 16. The recording circuit 10 includes an analog color television signal source 18 which supplies an analog video signal including a luminance component Y and two chrominance components I and Q to the inputs of analog to digital converters 20, 22, and 24 respectively. This analog video signal is converted to a digital video signal which is changed to the altered digital video signal A of FIG. 2 in a manner hereafter descirbed.

The converters convert the analog signals into digital signals and transmit such digital signals to a Y word buffer 26, an I word buffer 28, and a Q word buffer 30 respectively connected to the outputs of converters 20, 22, and 24. A clock pulse generator 32 which is synchronized to the analog video signal source 18 transmits bit pulses B to the buffers 26, 28, and 30 along line 34 to clock the digital information from the converters 20, 22, and 24 into such buffers. In addition, the output 34 of the clock 32 is connected to a divide by N counter 36, which divides the bit pulses by N, the number of bits per luminance work, to produce luminance work pulses C at output 38 which are transmitted to the converter 20 to cause it to produce luminance words Y of digital bits. As a result, the A to D converter 20 transmits luminance words into the Y word buffer 26 at the bit frequency B. The output 38 of counter 36 is also transmitted through a divide by M counter 40 which divides the Y work pulses C by M, the number of Y words per I or Q chrominance words, to produce work pulses D at output 42. The chrominance word pulses D are transmitted to the analog to digital converters 22 and 24 to cause them to transmit digital output words to the buffers 28 and 30. For example, if counter 36 is a divide by 5 counter, while counter 49 is a divide by 3 counter to provide the pulses B, C, and D or FIG. 2, one I or Q word is transmitted to the buffers for every three Y words transmitted to buffer 26.

Figure 2:
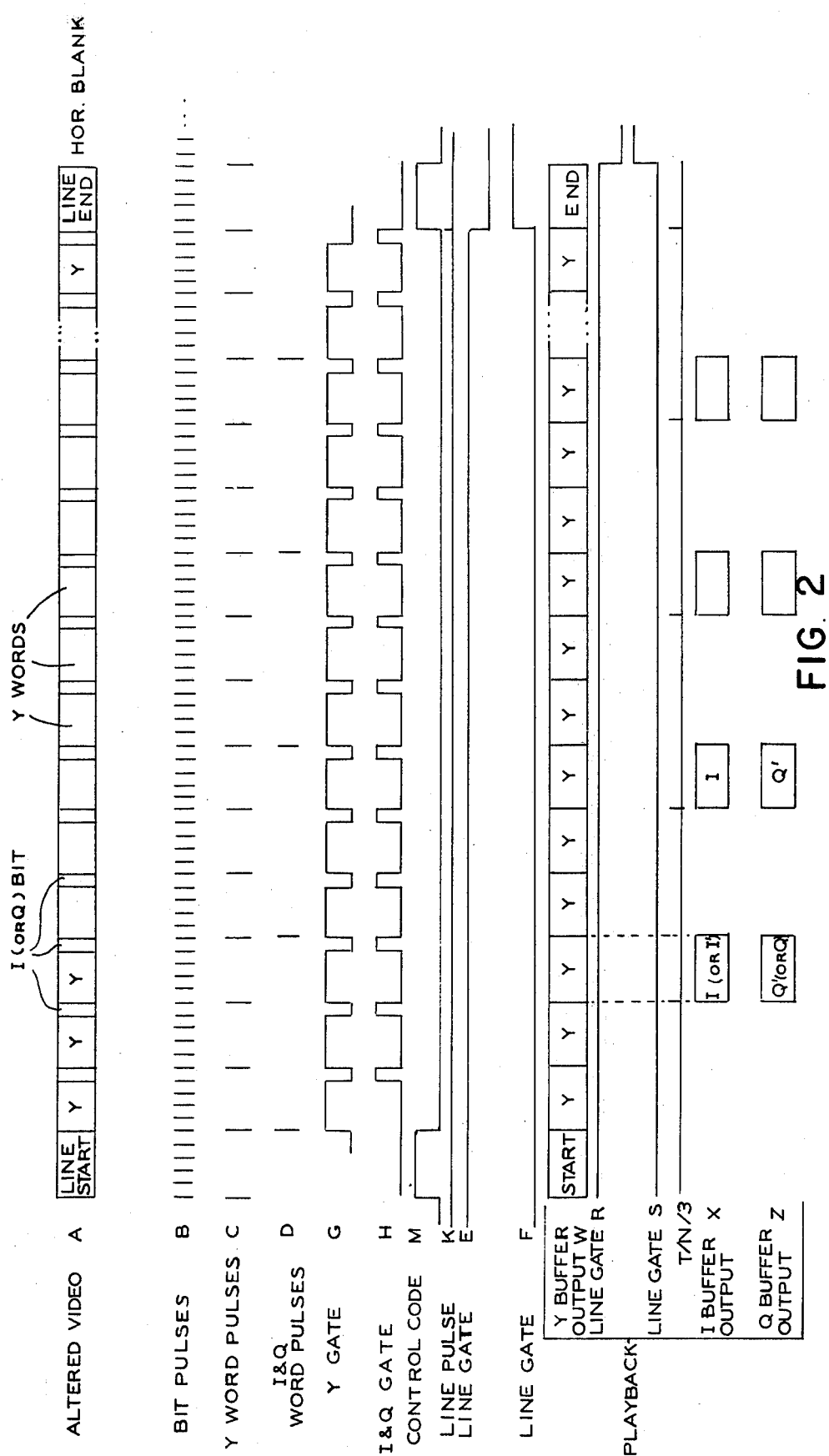
FIG. 2 is a diagram of electrical signal waveforms and recorded digital information produced in the system of FIG. 1.

Readout of the buffers is provided by gating pulses G and H which are generated at the outputs 44 and 46, respectively, of a sequence control logic circuit 48. The sequence control logic circuit 48 is of conventional design with a plurality of flip-flops and gates whose conduction is controlled by the input pulses B, C, D, F, and K as shown in FIG. 1. The Y gating pulses G are applied to the buffer 26 and to an AND gate 50, also connected to the output of such buffer, in order to transmit the luminance words Y from the buffer to the output of gate 50. The I and Q gating pulses H are applied to both buffers 28 and 30 and to AND gates 52 and 54 respectively connected to the outputs of such buffers. Gates 52 and 54 also have inputs connected to the alternate outputs 56 and 58 of a bistable flip-flop 60 which produces alternate line gating pulses E and F on outputs 56 and 58 respectively. Thus, flip-flop 60 is triggered once per line by the line pulse K output 62 of a divide by P counter 64, connected to the output 34 of clock 32, where P is the number of bits per television line. As a result of the line gating pulses E and F generated on alternate lines, and AND gates 52 and 54 are rendered conducting on different lines to transmit the I word signals and Q word signals through such gates to two of the inputs of an OR gate 66. The output of OR gate 66 is connected as the output of the recording circuit 10 to the input of the record and playback unit 14. Another input of the OR gate 66 is connected to the output of the AND gate 50, for transmitting the Y words through such OR gate. The fourth input of the OR gate 66 is connected to a control code output 68 of the sequential control circuit 48. As shown in FIG. 2, the control code pulses M are produced on output 68 at the beginning of the line to provide the line start and color phase information, and at the end of the line to provide line end and sync information.

The record and playback unit 14 records the altered digital video television signal A transmitted from the output of the record circuit 10 as shown at the top of FIG. 2. This altered video signal A consists of Y words which, in the example given, are 4 bits wide, such Y words being separated by single bits of I or Q chrominance information. As noted above, the I and Q bits alternate between adjacent television lines so only one chominance component is recorded on each line. Of course the width of the recorded Y words and I or Q words is set by the gate signals G and H respectively, since the AND gates 50, 52, and 54 are only conducting when these gate signals are positive.

The record and playback unit 14 may be a conventional magnetic tape recorder or it may be an optical digital recording and playback unit as shown in U.S. Pat. No. 3,501,586 of J. T. Russell, issued Mar. 17, 1970, or in copending U.S. Pat. application Ser. No. 516,453 of J. T. Russell, filed Dec. 21, 1974.

The playback apparatus 12 may be separate from the recording apparatus 10, in which case a separate playback unit is provided, such as when using an optical record. The electrical output signal of the playback unit 14 is transmitted from an output 70 to the input of a data shift register 72. The digital data is fed into the shift register 72 at a frequency determined by clock pulses T produced by a clock generator 74. The data shift register 72 transmits luminance words Y through parallel outputs to a Y word buffer 76, whose parallel outputs are connected to a digital to analog converter 78. The data shift register 72 also produces a series output 86 for I and Q words corresponding to the I or Q bits of the altered video signal A. These I or Q words are fed to the input of a digital storage means 80 such as a shift register, which stores the I or Q words for a time duration equal to one television line and produces a delayed chrominance word I' or Q' at output 82 which is delayed one line from the input words I or Q. The I or Q bits are clocked out of the shift register 72 by timing pulses T/N supplied by a divide by N counter 83. The divide by N counter connected to the output of clock 74, produces Y work clock pulses T/N, where N is the number of bits per word. A divide by 3 counter 84 is connected to the output of counter 83 and produces I or Q word clock pulses T/N/3 which are applied to the I and Q buffers 104 and 108 to clock the outputs of such buffers to the D to A converters as hereafter described. As shown in FIG. 2, the recorded signal A has a single I or Q bit recorded between each Y word. Assuming it requires 3 I or Q bits to form one I or Q word, each of the buffers 104 and 108 has its output clocked by the T/N/3 pulses of counter 84 to produce I or Q words at its output. It should be noted that the I and Q bits on output 86 of register 72 are derived from the same line of the altered video signal A as the Y words transmitted to buffer 76, while the delayed I' or Q' bits at output 82 of storage register 80 are derived from the previous line of the recorded signal.

A pair of AND gates 88 and 90 are provided with one input of gate 88 connected to the output 86 of the data shift register 72 and one of the inputs of gate 90 connected to the delayed output 82 of the storage register 80. Similarly a second pair of AND gates 92 and 94 is provided with one of the inputs of gate 92 connected to the output 86 of the shift register 72 while one of the inputs of gate 94 is connected to the delayed output 82 of the storage register 80. The other inputs of gate 88 and 94 are connected together to the R gate signal output 96 of a code detect circuit 88 while the other inputs of AND gates 90 and 92 are connected together to the S gate signal output 100 of such code detect circuit. The gate signals R and S are line gate signals which are produced alternately for the duration of alternate television lines as shown in FIG. 2.

The outputs of AND gates 88 and 90 are connected through an OR gate 102 to the input of I word buffer 104. Similarly AND gates 92 and 94 have their outputs connected through another OR gate 106 whose output is connected to Q word buffer 108. As a result either the undelayed I bits or the delayed I bits, I', are transmitted to the I buffer 104 during each television line signal, while either undelayed Q bits or delayed Q bits, A', are transmitted to the Q buffer 108 during each television line. The buffers 104 and 108 have clocking inputs connected to the T/N output of counter 83 and clocking outputs connected to the T/N/3 output of counter 84, so that such buffers produce parallel chrominance word outputs X and Z once for each 3 luminance word output W of buffer 76. The parallel outputs of the buffers 104 and 108 are connected to the digital to analog converters 110 and 112 respectively which convert the parallel digital signal into series analog signals.

The analog outputs of converters 78, 110, and 112 respectively transmit analog luminance words Y and chrominance words I and Q to a conventional NTSC modulator 114 which modulates such signals into a composite analog NTSC color video signal at output 116 while receiving clock pulses T from clock 74 and a composite sync signal at input 118. A composite sync signal is produced by a composite sync generator 120 whose two inputs are connected respectively to a horizontal sync 124 and vertical sync 122 of the code detect circuit 98. The code detect circuit 98 has its inputs connected to parallel outputs 126 of the data shift register 72, which supplies coded information to the code detect circuit during the time of control code pulse M t the begining and end of the recorded line signal A. Of course, a composite analog video signal produced at output 116 of the playback circuit 12 may be applied to a conventional television receiver 16 for display.

Figure 3:
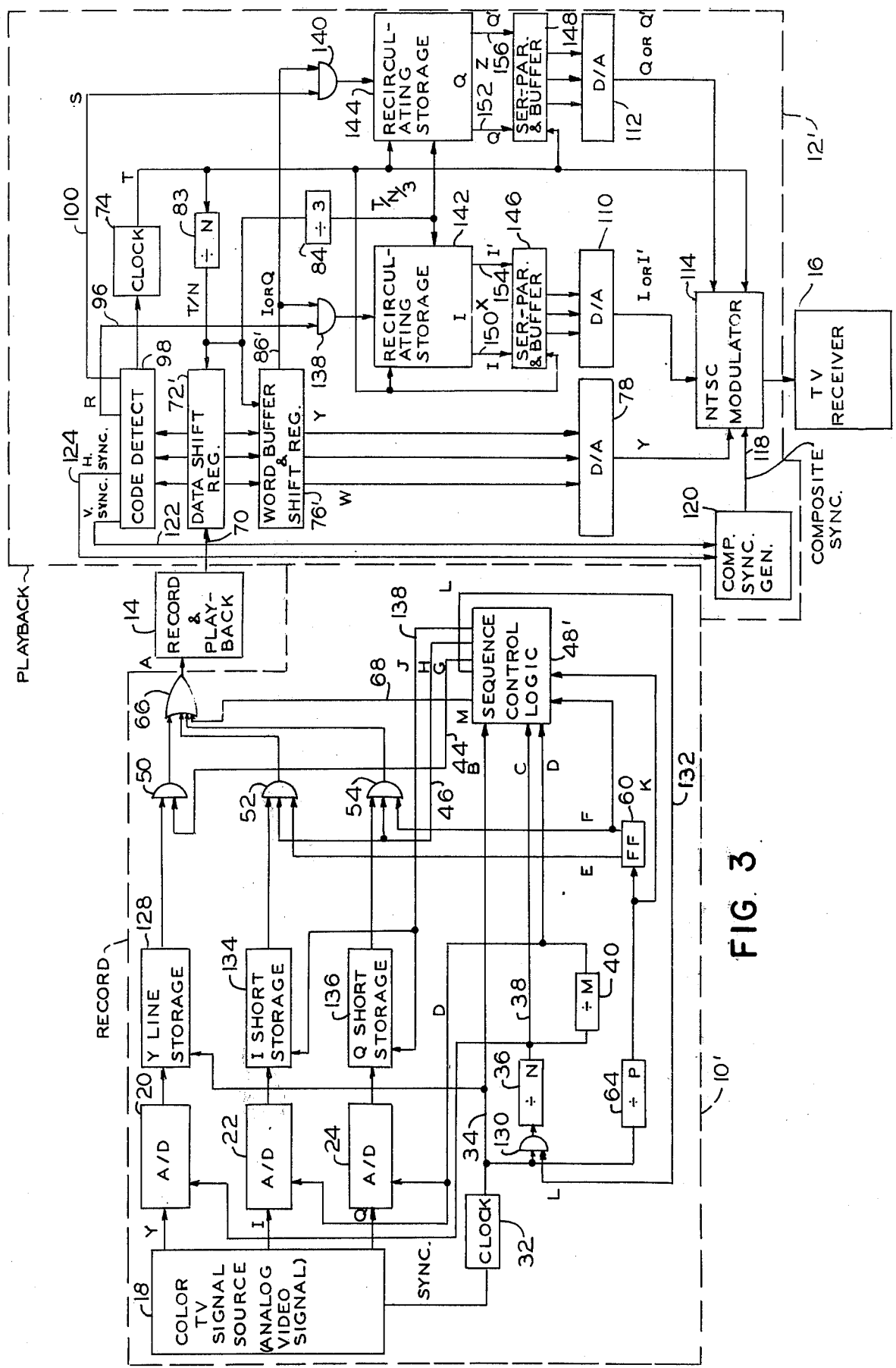
FIG. 3 is a schematic diagram of the electrical circuit of a second embodiment of the digital color television system of the present invention.
Figure 4:
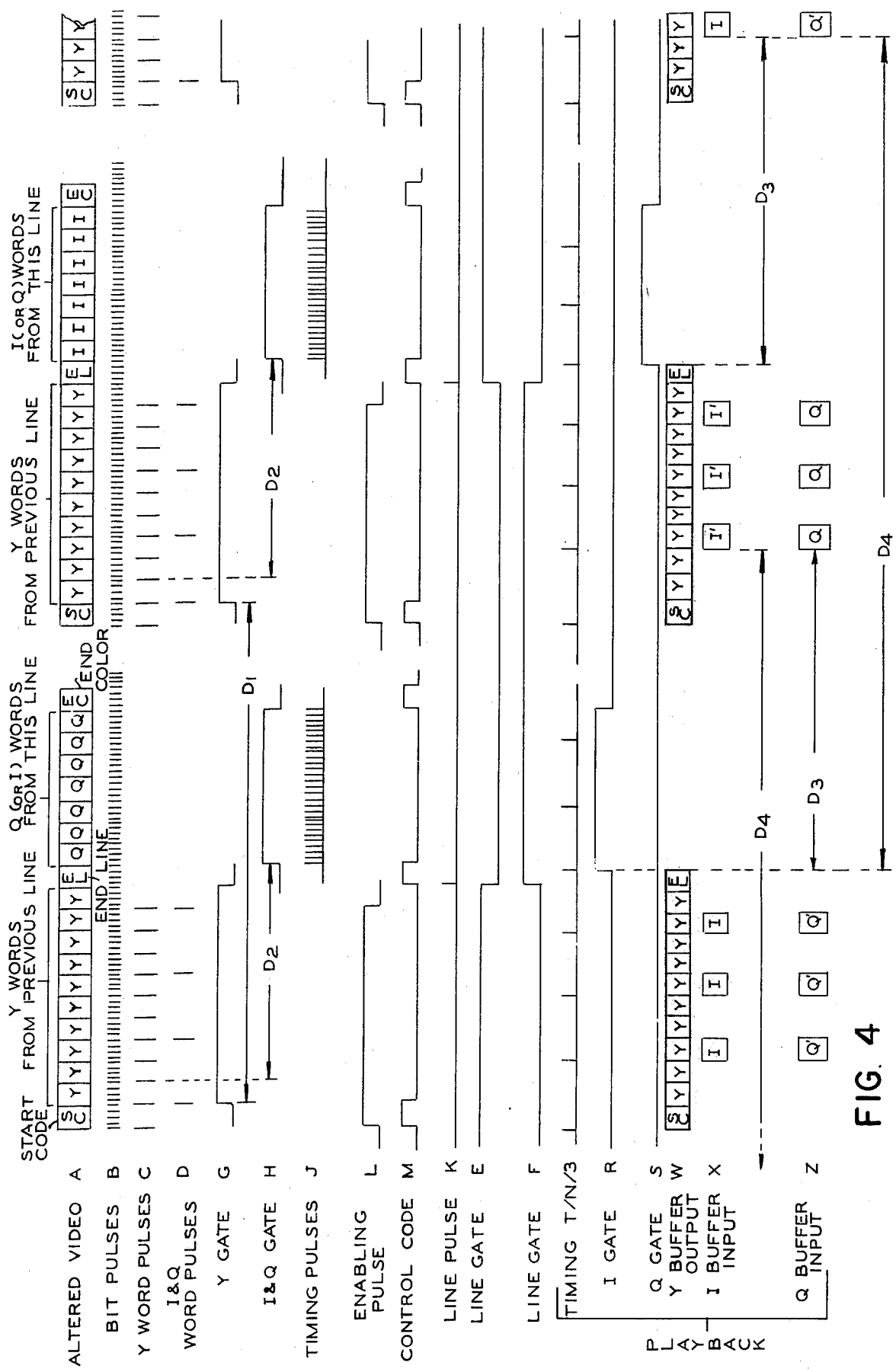
FIG. 4 is a diagram of electrical signal waveforms and recorded digital information produced in the system of FIG. 3.

Another embodiment of the digital color television system of the present invention, shown in FIGS. 3 and 4, is similar to that of FIGS. 1 and 2 so that the same reference numerals have been used to designate like components in both. Thus, the digital Y signal is transmitted from the analog to digital converter 20 into a Y line storage circuit 128, such as a shift register which stores the luminescent signal Y for one television line to delay the Y words a first time delay $D_1$. The analog to digital converter 20 is gated by the Y word clocking pulses C produced by counter 36 only during the time of an enabling signal L shown in FIG. 4, which is applied to an AND gate 130 connected between the output of clock 32 and the input of counter 36. This enabling signal L is produced at an output 132 of the sequence control logic circuit 48'. It should be noted that since the counter 40 is connected between the output of counter 36 and the analog to digital converters 22 and 24, such converters are also clocked by pulses D only during the enabling signal L. Thus, the analog to digital converters 20, 22, and 24 only transmit digital output signals corresponding to the Y words and the I and Q words during the time of the enabling signal L.

The output of converter 22 is connected to an I storage circuit 134 while the output of converter 24 is connected to a Q storage circuit 136. The two storage circuits 134 and 136 which may be shift registers, only store the I and Q words for a short second time delay, $D_2$ in FIG. 4, which is less than one television line. As a result of the Y line storage 128, the altered digital video signal A transmitted during the period of the Y gate signal G through the AND gate 50 and the OR gate 66 to the recorded playback unit 14, includes Y words from the previous television line. The I and Q gate signals H are produced by the sequence control logic circuit 48' at a time immediately after the "end of line" word at the end of the Y words in the altered video signal A, as shown in FIG. 4. Thus, the gating signal H and the corresponding I and Q words in the altered video signal A are delayed a delay time $D_2$ equal to the time between the end of the first Y word of the line to the end of the end of line word. It should be noted that timing pulses J corresponding in frequency to the bit pulses B are produced at output 138 of the sequence control loggic 48' and applied to both of the storage circuits 134 and 136. As a result, the I or Q words are recorded after the Y words at the end of the television line. As stated previously, the recorded Y words are actually taken from the previous line due to the full line delay of storage circuit 128. Like the embodiment of FIG. 1, the I and Q chrominance words only appear in different alternate lines of the altered video signal A transmitted from the record circuit 10' to the recorder unit.

The playback circuit 12' of FIG. 3 differs from that of FIG. 1 in that the data shift register 72' does not provide a series output for the I and Q words but instead transmits them along with the Y words through parallel outputs to the word buffer 76' which also may be a shift register. Buffer 76' provides a series output 86' for the I or Q words, which are fed to one of the inputs of each of a pair of AND gates 138 and 140. The other inputs of AND gates 138 and 140 are respectively connected to the R gating signal output 96 and the S gating signal output 100 of the code detector circuit 98 to render the ANd gates conducting on alternate lines of the altered video signal A. The output of AND gate 138 is connected to an I storage circuit 142 while the output of AND gate 140 is connected to a Q storage circuit 144, both of which may be recirculating type shift registers. The recirculating storage circuits 142 and 144 each have two series outputs which are transmitted into one of a pair of series to parallel converters and buffers 146 and 148. Thus, the I and Q storage circuits 142 and 144 each have a first output 150 and 152 on which an I or Q word is produced, having a short time delay $D_3$ less than one television line and corresponding to the recirculation time from the end to the beginning of the shift registers. In addition, the I and Q storage circuits each have a second output 154 and 156 on which a delayed I' and Q' word is produced with a long time delay $D_4$ slightly greater than one television line, as shown in FIG. 4.

As a result of the above discussed time delays, $D_1$, $D_2$, $D_3$, and $D_4$, the output signal of the buffers to the D to A converters 78, 110, and 112 for a given television line includes Y words and I or Q words from the first previous line and Q' or I' words from the second previous line. Thus the analog video output signal of the NTSC modulator 114 includes a Y component and an I or Q component from the same television line, and a delayed Q' or I' component from the next line so that it is similar to the analog video output signal in FIG. 1. However, the embodiment of FIGS. 3 and 4 has the additional advantage that the color signal components I and Q of the altered digital video signal A are transmitted and recorded during the horizontal blanking period following the end of the line of luminance components Y. This further reduces the amount of digital information which must be stored on the optical or magnetic by the record and playback unit 14.

It will be obvious to one having ordinary skill in the art that many changes may be made in the above described details of the preferred embodiments of the present invention without departing from the spirit of the invention. Therefore, the scope of the present invention should only be determined by the following claims.

I claim:

1. A digital color television system comprising: input means for supplying a digital video color television line signal including a luminance signal component and two different chrominance signal components, said input means including a plurality of digital storage means for storing said digital line signal components so that said two chrominance components are each stored in different storage means;

gate means connected to the outputs of said plurality of storage means, and including control logic means for selectively transmitting said television line signal components through said gate means so that altered digital television line signals are produced at the output of the gate means which each include a luminance component and only one of said two chrominance components with said two chrominance components alternating in successive television line signals;

said gate means causing chrominance component words and corresponding luminance component words to be provided in the altered digital line signal at positions adjacent each other, each of said words being shorter than one television line, so that successive luminance words in the same television line are separated by the chrominance words in an alternating manner;

digital delay means for delaying the chrominance components of the altered digital television line signals to produce delayed digital chrominance components at the output of said delay means; and output means for combining the delayed chrominance components with components of said altered line signals to produce a television line signal output including a luminance component and two different chrominance components at least one of which was obtained from an altered line signal other than that from which its luminance component was obtained.

2. A television system in accordance with claim 1 which also includes recorder means for recording the altered digital television line signals on a record, and playback means for playing back said record to transmit the recorded altered line signals through said digital delay means.

3. A television system in accordance with claim 2 in which the record is an optical digital record.

4. A television system in accordance with claim 1 in which the digital delay means delays the chrominance component a time delay greater than the duration of one luminance word.

5. A television system in accordance with claim 4 in which the time delay is at least as long as one television line.

6. A television system in accordance with claim 1 which also includes coupling means for transmitting a portion of the chrominance components of the altered line signals to the output means without passing through said delay means to provide an undelayed chrominance component which is combined with the luminance component and with a delayed chrominance component of different type than said undelayed chrominance component to form the line signal output.

7. A digital color television signal playback apparatus comprising:

an optical record having altered digital color television line signals recorded thereon each including a luminance signal component and only one chrominance signal component, with two different chrominance signal components being provided in an alternating manner in successive television line signals, said chrominance components being formed by the actual color values present in the television line signal;

said record having chrominance component words and luminance component words forming the altered line signals, recorded thereon at positions adjacent each other, each of said words being shorter than one television line, so that the successive luminance words in the same television line signal are separated by the chrominance words in an alternating manner;

playback means for playing back said record to reproduce said altered line signals;

digital delay means for delaying the chrominance components of the altered digital television line signals to produce delayed chrominance components; and output means for combining the delayed chrominance components with components of said altered line signals to produce a television line signal output including a luminance component and two different chrominance components at least one of which was obtained from an altered line signal other than that from which its luminance component was obtained.

8. A television playback apparatus in accordance with claim 7 which also includes means for transmitting a portion of the chrominance components of the altered line signals to the output means without pasing through said delay means to provide an undelayed chrominance component which is combined with the luminance component and with a delayed chrominance component of different type, the said undelayed chrominance component to form the line signal output.

9. A digital color television system, comprising: input means for supplying a digital video color television signal including a luminance signal component and two different chrominance signal components;

gate means for selectively transmitting said television signal so that altered digital television line signals are produced at the output of the gate means which each include a luminance component and only one of said two chrominance components with said two chrominance components alternating in successive television line signals;

digital delay means for delaying the chrominance components of the altered digital television line signals to produce delayed chrominance components, said digital delay means including first and second delay means for delaying the two different chrominance components of successive altered line signals and for transmitting the two delayed chrominance components to the output means which combines them with the luminance component to form the line signal output, each of said first and second delay means delaying only one of said two different chrominance components; and output means for combining the delayed chrominance components with components of said altered line signals to produce a television line signal output including a luminance component and two different chrominance components at least one of which was obtained from an altered line signal other than that from which its luminance component was obtained.

10. A television system in accordance with claim 9 in which the gate means is operated to cause successive luminance words to be provided in the altered digital line signal without intervening chrominance words and successive chrominance words to be provided without intervening luminance words in said altered line signal.

11. A television system in accordance with claim 10 in which the chrominance words are provided at the end of the line signal at a time corresponding to the horizontal blanking time of the television signal.

12. A digital color television signal playback apparatus comprising:

a record having altered digital color television line signals recorded thereon each including a luminance signal component and only one chrominance signal component, with two different chrominance signal components being provided in an alternating manner in successive television line signals;

playback means for playing back said record to reproduce said altered line signals;

digital delay means for delaying the chrominance components of the altered digital television line signals to produce delayed chrominance components, said digital delay means including first and second delay means for delaying the two different chrominance components of successive altered line signals and for transmitting the two delayed chrominance components to the output means which combines them with the luminance component to formthe line signal output, each of said first and second delay means delaying only one of said two different chrominance components; and output means for combining the delayed chrominance components with components of said altered line signals to produce a television line signal output including a luminance component and two different chrominance components at least one of which was obtained from an altered line signal other than that from which its luminance component was obtained.

13. A television playback apparatus in accordance with claim 12 in which successive luminance words of the altered digital line signal are recorded on the record without intervening chrominance words and successive chrominance words are recorded without intervening luminance words in said altered line signal.

14. A television playback apparatus in accordance with claim 13 in which the chrominance words are recorded at the end of the line signal at a time corresponding to the horizontal blanking time of the television signal.

* * * * *

UNITED STATES PATENT OFFICE
CERTIFICATE OF CORRECTION

Patent No. 4,015,286          Dated March 29, 1977

Inventor(s) James T. Russell

It is certified that error appears in the above-identified patent and that said Letters Patent are hereby corrected as shown below:

Column 2, line 50, "descirbed" should be --described--.

Column 2, line 62, "work" should be --word--.

Column 2, line 63, "work" should be --word--.

Column 3, line 1, "work" should be --word--.

Column 3, line 2, after "produce" insert --chrominance--.

Column 3, line 2, "work" should be --word--.

Column 3, line 7, "49" should be --40--.

Column 3, line 8, "or" should be --of--.

Column 3, line 32, after "," "and" should be --the--.

Column 4, line 47, "88" should be --98--.

Column 4, line 61, "A'" should be --Q'--.

Column 5, line 18, "t" should be --at--.

Column 5, line 65, "end of line" should be --"end of line"--

UNITED STATES PATENT OFFICE
CERTIFICATE OF CORRECTION

Patent No. 4,015,286        Dated March 29, 1977

Inventor(s) James T. Russell

It is certified that error appears in the above-identified patent and that said Letters Patent are hereby corrected as shown below:

Column 5, line 68, "loggic" should be --logic--.

Column 6, line 21, "ANd" should be --AND--.

Column 6, line 56, after "magnetic" insert --record--.

Column 10, line 2, "formthe" should be --form the--.

Signed and Sealed this

Fourteenth Day of June 1977

[SEAL]

Attest:

RUTH C. MASON  
Attesting Officer

C. MARSHALL DANN  
Commissioner of Patents and Trademarks